United States Patent

[11] 3,604,636

| [72] | Inventors | Rudolph J. Gasparac<br>West Milwaukee;<br>Arnold P. Szaj, Hales Corners, both of, Wis. |
|---|---|---|
| [21] | Appl. No. | 815,948 |
| [22] | Filed | Apr. 14, 1969 |
| [45] | Patented | Sept. 14, 1971 |
| [73] | Assignee | Nordberg Manufacturing Company<br>Milwaukee, Wis. |

[54] CONE CRUSHER FEED DISTRIBUTOR AND METHOD
10 Claims, 3 Drawing Figs.

[52] U.S. Cl. .................................................. 241/30,
193/3, 241/202, 241/301
[51] Int. Cl. ...................................................... B02c 2/04
[50] Field of Search .......................................... 241/30,
202, 301; 193/3

[56] References Cited
UNITED STATES PATENTS

| 2,917,247 | 12/1959 | Gruender | 241/202 |
| 2,971,705 | 2/1961 | Werner | 241/202 |
| 3,212,720 | 10/1965 | Gasparac | 241/202 X |
| 3,358,939 | 12/1967 | Gasparac | 241/202 |
| 3,446,444 | 5/1969 | Kern | 241/202 |
| 2,509,919 | 5/1950 | Gruender | 241/202 X |
| 2,737,289 | 3/1956 | Peters | 198/220 |
| 3,384,215 | 5/1968 | Gasparac | 193/3 |
| 3,506,203 | 4/1970 | Rossi | 241/202 |

OTHER REFERENCES

Nordberg. Gyradisc Bulletin No. 22B, 3 pages (unnumbered), Nordberg Mfg. Co., 1954, Copy in Group 320, class 241, sub. 202.

*Primary Examiner*—Donald G. Kelly
*Attorney*—Parker, Carter & Markey

ABSTRACT: A rotary feed distributor for gyratory crushers which is designed to retain a dead bed of material therein. The bed of material prevents abrasion of the distributor without restricting flow of material between the upper intake opening and the lower, radially outwardly spaced outlet thereof. The bottom of the distributor has bars affixed thereto to retain some feed material such that the wear-preventing dead bed is formed.

PATENTED SEP 14 1971　　　　　　　　　3,604,636

INVENTORS.
RUDOLPH J. GASPARAC
ARNOLD P. SZAJ
BY Parker, Carter & Markey
Attorneys.

CONE CRUSHER FEED DISTRIBUTOR AND METHOD

SUMMARY OF THE INVENTION

This invention is in the field of cone crushers and is concerned with a method and apparatus for controlling, feeding, distributing and regulating the flow of material to the crushing cavity of a cone crusher.

A primary object is an independently operable feeder and distributor for cone crushers and the like.

Another object is a method of distributing material to the crushing cavity of a cone crusher which insures maximum crushing efficiency.

Another object is a feed distributor for cone crushers of the above type which has much greater life.

Another object is a feed distributor and method for controlling the feed to cone crushers which greatly reduces maintenance and service costs.

Another object is a feed distributor which prevents segregation.

Another object is a feed distributor which is specifically constructed for rapid repair.

Another object is a feed distributor of the above type which is practically wear-resistant.

Another object is a rotary feed distributor which does not require delicate balancing.

Another object is a method of controlling and regulating the feed to a cone crusher which simultaneously eliminates segregation and wear.

Other objects will appear from time to time in the ensuing specification and drawings in which:

DESCRIPTION OF THE PREFERRED EMBODIMENT

Figure 1:
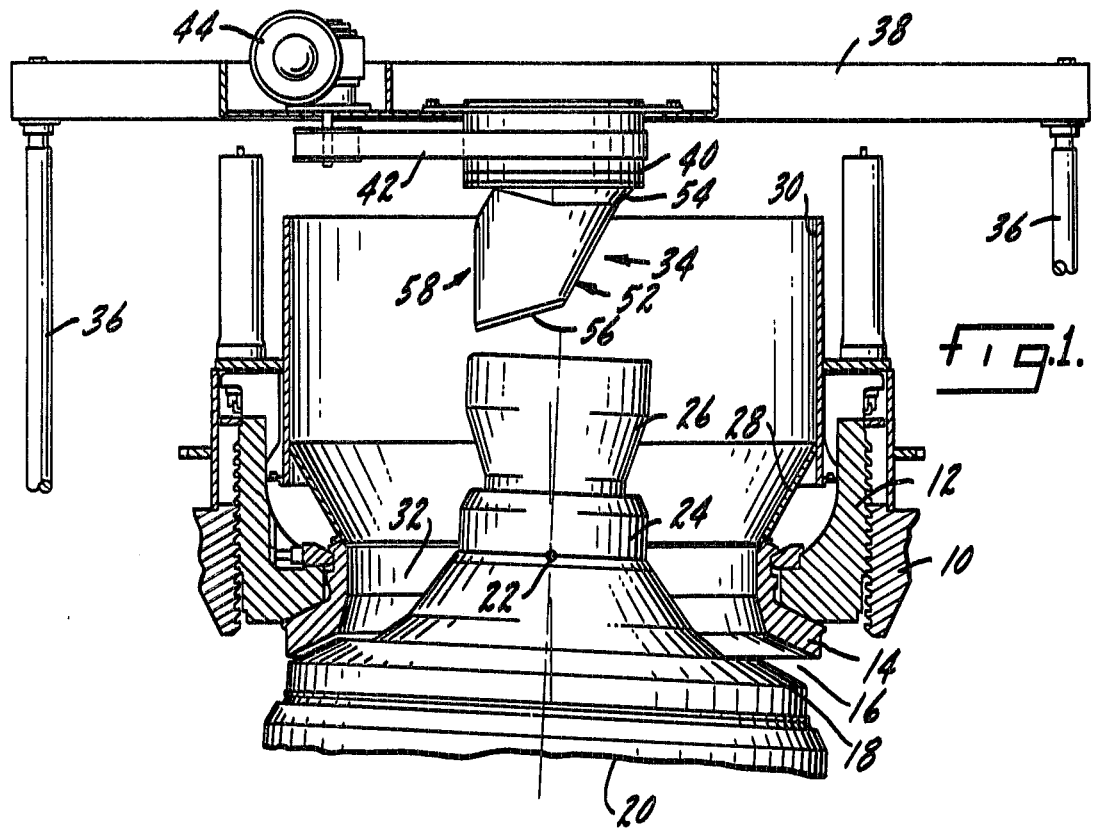
FIG. 1 is a vertical section of the upper portion of a crusher.

In FIG. 1 the upper part of a cone crusher has been shown which normally includes a main frame, not shown, supported on a tilting ring 10. The tilting ring may be held in position by a plurality of springs, not shown, commonly referred to as a spring release, disposed about the crusher. A bowl 12 is screw-threaded into the tilting ring 10 in a conventional manner and removably supports a liner 14 which defines a part of a crushing cavity 16 in cooperation with a mantle 18 supported on a suitable head 20 which, in turn, is constructed to be gyrated about a focal point 22. The head swivels in a spherical socket, not shown, so as to be gyrated without being rotated. The mantle may be held in place through suitable lock rings and sleeves which are held down by a head nut 24 above which is positioned an extension cap 26. The head nut and extension cap rise above the crushing cavity. They are more or less on a level with the feed cone or conic wall 28, which has or is associated with a more or less cylindrical upper wall 30. The conic wall 28 is truncated or tapered inwardly in such fashion as to direct material to the crushing cavity 16. Where the crushing is carried on between the members 14 and 18, crushing takes place in the cavity 16. Where the upper part of the head, in some forms of cone crushers, is relied upon to perform a crushing function, an upper crushing cavity 32 may be provided. There is room for a wide variety of changes in the form of the liner and mantle to form the crushing cavity 16 and zone 32. Both cone liner 14 and mantle 18 are of appropriate material to perform their crushing function. While a particular style of crusher has been shown and described, it should be understood that this is merely representative of a number of crushers which may include or incorporate the invention.

A feed distributor, indicated generally at 34, delivers material to be crushed from above by a distributor element, to be described in detail hereinafter. The feed distributor is considered to be generally coaxially mounted with the upright main axis of the crusher. The basic object of the feed distributor is to prevent the segregation of material in the crushing cavity, meaning that all or substantially all of the fine material will go to one side or all or substantially all of the coarse material will go to the other, which will result in pounding, uneven wear, and inefficient overall operation of the crusher.

Suitable support posts 36, mounted on the crusher frame support a cross or top platform 38, which in turn supports the feed distributor. The distributor is suspended or extends downwardly from the top plate or platform 38 and is employed to discharge or distribute material in a generally lateral direction or plane at a point within, above and aligned with the feed cone 28 and its upper wall 30. The material to be crushed is initially fed into a rotary unit 40 which may be the same in detail as any one of those shown in U.S. Pat. No. 3,212,720, issued Oct. 19, 1965; U.S. Pat. No. 3,358,935, issued Dec. 19, 1967; and U.S. Pat. No. 3,384,215, issued May 21, 1968, all assigned to the present assignee. A belt drive 42 or the like may be employed connected to a drive motor 44 which may be electric, hydraulic or otherwise, to rotate the distributor. The motor drive is totally separate from whatever source of power is used to gyrate the crushing head so that the distributor may be set at a rate of distribution which is totally independent of the crushing rate, or it may be coordinated to it. The details of the motor, drive, and rotary element 40 will not be shown or explained in detail as they may be the same as in the above referred to patents. It will be understood that a suitable tube 46 or passage extends down through the middle of the rotary element 40 so that material will be supplied from any suitable feed mechanism down to and along the general central axis of the crusher into the distributor itself.

Particles of mixed size, to be reduced, are fed into the upper end of the distributor 34. The particles so fed are delivered by gravity downwardly through tube 46 into the distributor or chamber. The distributor itself may be in the form of an attachment suitably bolted or otherwise connected to the rotary element and may have a flange 48 or the like at its upper end with suitable bolt holes 50 so that it may be detachably connected to the rotary element in any suitable manner.

Figure 2:
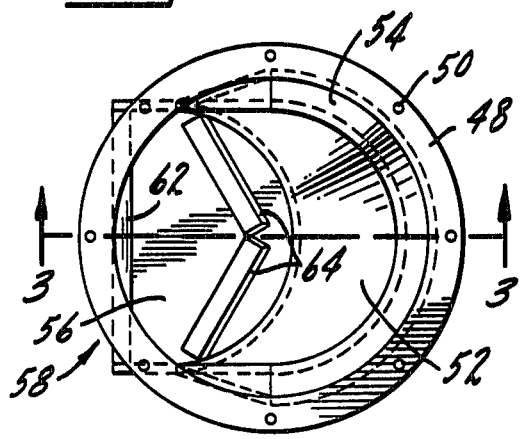
FIG. 2 is a top view, on an enlarged scale, of the feed distributor of FIG. 1.
Figure 3:
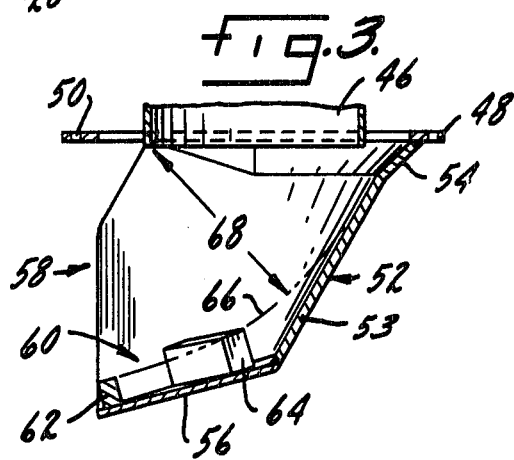
FIG. 3 is a section along line 3—3 of FIG. 2.

The main body portion or spout 52 of the distributor may be formed as a curved plate 53 with a filler 54 and a bottom, somewhat inclined distributor plate 56, all suitably welded or otherwise connected together. The main plate 53 may be bent in a U-shaped formation, as shown in FIG. 2, so that the discharge end or side 58 of the distributor is substantially completely open on one side but is closed in the rear and on each side by suitable wall formations. The combination of the inclined rear 53 and the bottom 56 gives the overall cross-sectional configuration a downwardly and outwardly sloping arrangement so that the material, as gravitally fed downwardly from the inlet 46, will be directed downwardly and outwardly in an arcuate movement to a free discharge in a rotating uniform stream about and above the upper extension of the crushing cavity so as to impinge either totally or in part against the feed chute and its extension 28 and 30.

A retaining formation 60 is disposed in the bottom of the distributor and may take the form of a bottom bar 62 welded or otherwise secured at or directly adjacent the lip or bottom peripheral edge of the inclined distributor plate 56. The bar 62 is more or less laterally disposed, is offset outwardly from the centerline of the crusher and is of sufficient height such that the material will be inclined to collect behind it. A second bar row 64 spaced up and in somewhat from the lower bar 62 is formed as two bars in a V diverging outwardly and downwardly and coming together at a suitable point more or less in the vicinity of the axis of the crusher. The bars as a group form a stop or retaining grate which will cause material to collect, and depending upon the angle of repose of the material and the centrifugal force applied to it relative to the distance from the axis of rotation of the distributor, the material will build into a dead bed or pad generally along the line 66 with the outline varying with the sides depending upon the angle of inclination of the double bar 64. The dimensioning is such that the passage area remaining, for example across a throat 68, will exceed the inlet cross section 46 so that the buildup of the pad or dead bed will not cause a restriction in the distributor but, on the other hand, will allow free and unimpeded flow.

The use, operation and function of the invention are as follows:

According to certain crushing methods, it is desirable that the feed to the crushing cavity be made up of a certain proportion and distribution of coarser particles and finer particles to prevent segregation and uneven crushing. It is quite important that segregation does not take place and that a thorough intermixing of coarse and fine particles should be delivered and distributed to the crushing cavity on a uniform cyclical basis. The thorough intermixing of particles of different sizes should be maintained and distributed to the crushing cavity on a uniform basis.

The material coming to a crusher is normally delivered by a conventional conveyor or belt and the particles have a tendency to segregate as they fall into the open top of the crusher, the coarse particles going to one side and the fine particles to the other. This will result in an uneven crushing action around the annular crushing cavity with the majority of work being done on one side. On the sides where the fines collect, the crusher will have a tendency to pound, which can cause spring bolt breakage and uneven wear on various frame parts. Further, this can result in uneven wear of the replaceable wearing elements, the mantle and liner, so that while one side of the mantle and liner may have very little or a minimum amount of wear, the other side may be considerably worn.

The distributor takes the form of an independently driven unit which is freely located more or less directly above the crushing head and aligned generally with it in a vertical direction. The distributor is located above and out of contact with the head. The distributor has its own independent drive and may be independently set at a suitable rate dependent upon operating conditions, the material being crushed, maintenance conditions, etc. The material is fed down through a chute or tube. The material enters the distributor and turns about 90° and is discharged at a side opening in a centrifugal or tangential motion. Any tendency on the part of the material entering the distributor to segregate is counteracted and prevented, first, by the chamber itself and, second, by the change in direction. The outlet from the distributor also has a cross-sectional area which is at least as great and preferably greater than the inlet so that the distributor, in and of itself, does not create a restriction or bottleneck.

The chamber in the distributor has a grate or grid or bar formation which will trap or retain a certain amount of material. One of the problems in the past has been that the material falling through the distributor will rapidly wear any exposed metal surfaces, particularly where the material is highly abrasive. While prior distributors have worked very well and have improved the overall crushing efficiency of the machine, in certain instances their life has been very short and frequent repairs and replacements have been required due to the material wearing out the exposed metal parts of the distributor.

The present arrangement has the advantage that a bed of material will be built up more or less in the bottom of the distributor so that thereafter the material coming through the inlet, turning and being discharged through the outlet, will flow basically across a bed or pad of material rather than the metal plates of the distributor. The formation has been shown as a series of lateral bars which are disposed more or less at 90° to the direction of flow of the material. Depending upon the angle of repose of the particular material and the particular grid or bar formation chosen, a bed will build up in the distributor and will stay there. The bed might tend to cause a restriction at an angle of, say, 45°, between the inlet and outlet. But the distribution and proportioning of parts is such that this throat, wherever it occurs, does not present a cross-sectional area less than the inlet. It is important that the height of the distributor outlet be such that a restriction will not occur. While the total flow area of the outlet may be adequate, a restriction will occur if the vertical height of the outlet is not adequate.

Whereas the inlet to the distributor is generally axially disposed and aligned with the axis of the crusher, the outlet is at an angle and is radially spaced outwardly from the center of the crusher and distributor. So all of the material must change direction in the course of which the coarse and fine particles are thoroughly and completely interspersed as they leave the distributor. There is absolutely no opportunity for the particles to segregate themselves between coarse and fine in the feed zone. Thus all portions of the crushing cavity will receive a fully intermixed supply of material which will result in uniform crushing action throughout and an even wear throughout the entire circumference of the crushing cavity.

It will be understood that the unit rotates and, depending upon the direction of rotation, the material, in leaving the outlet of the distributor, will have a tendency to be thrown against one sidewall of the distributor. It may be desirable for the dead bed of material to also rise along either one or both sidewalls in which case the bars that make up the grate or grill extend partially or totally along the inside of the walls or wear plates.

While the preferred form of the invention has been shown and described, it will be understood that suitable additional modifications, changes, substitutions and alterations may be made without departing from the invention's fundamental theme.

We claim:

1. In a crusher having a gyrated head, a frame, a bowl mounted on the frame and defining, with the gyrated head, a generally annular crushing cavity, power means for gyrating the head, a feed distributor above the head and generally aligned axially with the head, said feed distributor including a feed delivery element having an upper intake opening generally concentric with the axis of the head and an outlet spaced substantially downwardly from the intake and radially outwardly from the axis of the head, said feed delivery element having a downward and outward bottom portion underlying the intake opening and terminating radially outwardly of the circumference of the intake opening, a formation on the feed delivery element constructed to retain a certain bed of material to prevent abrasion of the element without restricting the flow of material on the bottom portion between the intake opening and the outlet, and separate power means for rotating the feed distributor.

2. The structure of claim 1 characterized in that the formation includes laterally disposed bars on the delivery element constructed to retain a certain depth of material.

3. The structure of claim 1 characterized in that the feed distributor includes a delivery element having an intermediate bend between its upper and lower ends.

4. The structure of claim 1 characterized in that the feed distributor includes a delivery element in the form of an open-topped chute having material guiding bottom and sides.

5. The structure of claim 1 further characterized by and including a bar on the bottom portion across the outlet and of limited height to dam up and retain a certain depth of material behind it as a wear-resistant pad on the bottom portion.

6. For use in a cone crusher having a frame and an overhanging bowl with a gyrating head mounted in the frame defining a crushing cavity with the bowl, the improvement comprising a feed distributor adapted to be positioned above the cavity and generally aligned axially with the head but spaced upwardly from the head, said feed distributor including a feed delivery element having an upper intake end generally concentric with the head and an outlet spaced substantially radially outwardly and downwardly from the intake, and a dead bed formation on the feed delivery element constructed to impede the flow of material so as to retain a certain depth thereof to establish a wear-resistant layer of material in the bottom of the distributor.

7. The structure of claim 6 further characterized in that the dead bed formation on the feed delivery element includes a bar laterally disposed across the outlet of the distributor and of limited height constructed to dam up and retain a certain depth of material behind it as a wear-resistant pad in the bottom of the feed distributor.

8. The method of operating a cone crusher which includes gyrating a crushing cone within a crushing zone about a generally vertical axis, traversing a downwardly and outwardly extending feed zone about the axis of the crusher cone while feeding material to the upper end of the feed zone generally along the axis of the cone, discharging the material from the lower, outer end of the feed zone, retaining a layer of material between the upper and lower ends of the feed zone over which the material moving between the upper and lower ends of the feed zone passes, allowing the material to move freely over the layer of material without restriction between the upper and lower ends of the feed zone, and carrying said lower outer end of the feed zone above and about the crushing cavity at a uniform rate of speed.

9. A method of feeding material to a gyratory crusher which has a gyrating crushing head and an overhanging bowl defining an annular crushing cavity with an upright axis, including the steps of feeding material to be crushed to a position generally axially aligned with and above the crushing cavity, allowing the material to fall by gravity through an inlet into a distribution zone defined above the crushing cavity and free of movement of the crushing head, prohibiting the flow of material from the distribution zone circumferentially so as to retain material therein, allowing material to escape from the distribution zone at at least one peripheral location in the side of the circumferential distribution zone at a point radially, outwardly and downwardly from the inlet, rotating the distribution zone about the upright axis at a constant rate of speed independent of the rate of gyration of the crushing head, retaining material in the bottom of the distribution zone over which the material moving between the inlet and outlet passes, using the retained material to prevent wear on the surfaces of the distribution zone, bottoming the distribution zone a sufficient axial distance down from the inlet but above the crushing head such that the accumulated material will not cause congestion in the distribution, zone, allowing material to move freely over the thus retained material without restriction between the inlet and outlet of the distribution zone, and carrying the outlet above and about the crushing zone at a generally uniform rate of speed to thus distribute unsegregated material around the top of the annular crushing cavity.

10. The method of claim 9 further characterized in that the step of retaining material in the bottom of the distribution zone includes blocking the bottom of the outlet to a minor vertical extent so that material will back up behind it in the bottom of the zone.